US007783664B2

(12) United States Patent
Douceur et al.

(10) Patent No.: US 7,783,664 B2
(45) Date of Patent: Aug. 24, 2010

(54) METHOD AND SYSTEM FOR PROTECTING THE CONSISTENCY OF INFORMATION IN A DISTRIBUTED FILE SYSTEM

(75) Inventors: John R. Douceur, Bellevue, WA (US); Jonathan R. Howell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1108 days.

(21) Appl. No.: 11/015,227

(22) Filed: Dec. 17, 2004

(65) Prior Publication Data

US 2006/0136369 A1 Jun. 22, 2006

(51) Int. Cl.
*G06F 7/00* (2006.01)
(52) U.S. Cl. ............... 707/783; 707/610; 707/640; 707/661; 707/704; 707/736; 707/822; 711/161; 711/114; 711/154; 714/4; 714/11; 714/12
(58) Field of Classification Search ............ 707/200, 707/999.2, 999.01, 999.009, 999.008, 610, 707/640, 661, 704, 736, 781, 822; 711/161, 711/114, 154; 714/4, 11, 12
See application file for complete search history.

(56) References Cited

U.S. PATENT DOCUMENTS

| | | | | |
|---|---|---|---|---|
| 5,608,870 A * | 3/1997 | Valiant | ............ | 711/100 |
| 5,778,395 A * | 7/1998 | Whiting et al. | ............ | 707/204 |
| 5,805,900 A | 9/1998 | Fagen et al. | | |
| 5,832,529 A * | 11/1998 | Wollrath et al. | ............ | 707/206 |
| 6,237,009 B1 * | 5/2001 | Waldo et al. | ............ | 707/206 |
| 6,353,869 B1 | 3/2002 | Ofer et al. | | |
| 6,473,819 B1 | 10/2002 | Jackson et al. | | |
| 6,643,650 B1 * | 11/2003 | Slaughter et al. | ............ | 707/10 |
| 6,658,417 B1 * | 12/2003 | Stakutis et al. | ............ | 707/10 |
| 6,671,821 B1 * | 12/2003 | Castro et al. | ............ | 714/4 |
| 6,862,666 B2 | 3/2005 | Chong et al. | | |
| 6,898,288 B2 | 5/2005 | Chui | | |
| 6,920,559 B1 | 7/2005 | Nessett et al. | | |
| 6,986,044 B1 | 1/2006 | Inada | | |
| 7,065,618 B1 * | 6/2006 | Ghemawat et al. | ............ | 711/161 |
| 7,315,926 B2 | 1/2008 | Fridella et al. | | |
| 7,346,720 B2 | 3/2008 | Fachan | | |

(Continued)

OTHER PUBLICATIONS

Title: Distributed Object Location in a Dynamic Network Author: Hildrum et al Date: Aug. 10-13, 2002 Publisher ACM pp. 41-52.*

*Primary Examiner*—Hosain T Alam
*Assistant Examiner*—Syling Yen
(74) *Attorney, Agent, or Firm*—Lee & Hayes, PLLC

(57) ABSTRACT

Disclosed are "black-box leases" that protect information consistency and that allow for information sharing in a distributed file system while hiding from a client information about other clients' use of the file system. This information hiding also allows greater concurrency because changes to the file system are permitted as long as they do not affect the leases as observed by the clients. For each data field protected by a black-box lease, a client has a two-value data structure: SelfValue represents the client's intended use of the data field, and OtherValue is an aggregation of the other clients' intended uses of that data field. Knowing only this aggregate OtherValue, but without knowing any specifics of the other clients' usage patterns, the client knows how it may use the data field without adversely affecting the consistency of data in the distributed file system.

32 Claims, 10 Drawing Sheets

U.S. PATENT DOCUMENTS

| | | |
|---|---|---|
| 7,350,226 B2 * | 3/2008 | Moriconi et al. .............. 726/1 |
| 7,376,744 B2 | 5/2008 | Loaiza et al. |
| 7,480,939 B1 | 1/2009 | Nessett et al. |
| 2002/0147719 A1 * | 10/2002 | Zhang et al. .................. 707/9 |
| 2002/0188605 A1 | 12/2002 | Adya et al. |
| 2003/0033351 A1 * | 2/2003 | Ricciardi .................. 709/202 |
| 2003/0076959 A1 | 4/2003 | Chui |
| 2004/0255048 A1 * | 12/2004 | Lev Ran et al. ............. 709/249 |
| 2009/0112789 A1 | 4/2009 | Oliveira et al. |
| 2009/0112811 A1 | 4/2009 | Oliveira et al. |
| 2009/0112879 A1 | 4/2009 | Oliveira et al. |
| 2009/0112880 A1 | 4/2009 | Oliveira et al. |
| 2009/0112921 A1 | 4/2009 | Oliveira et al. |

* cited by examiner

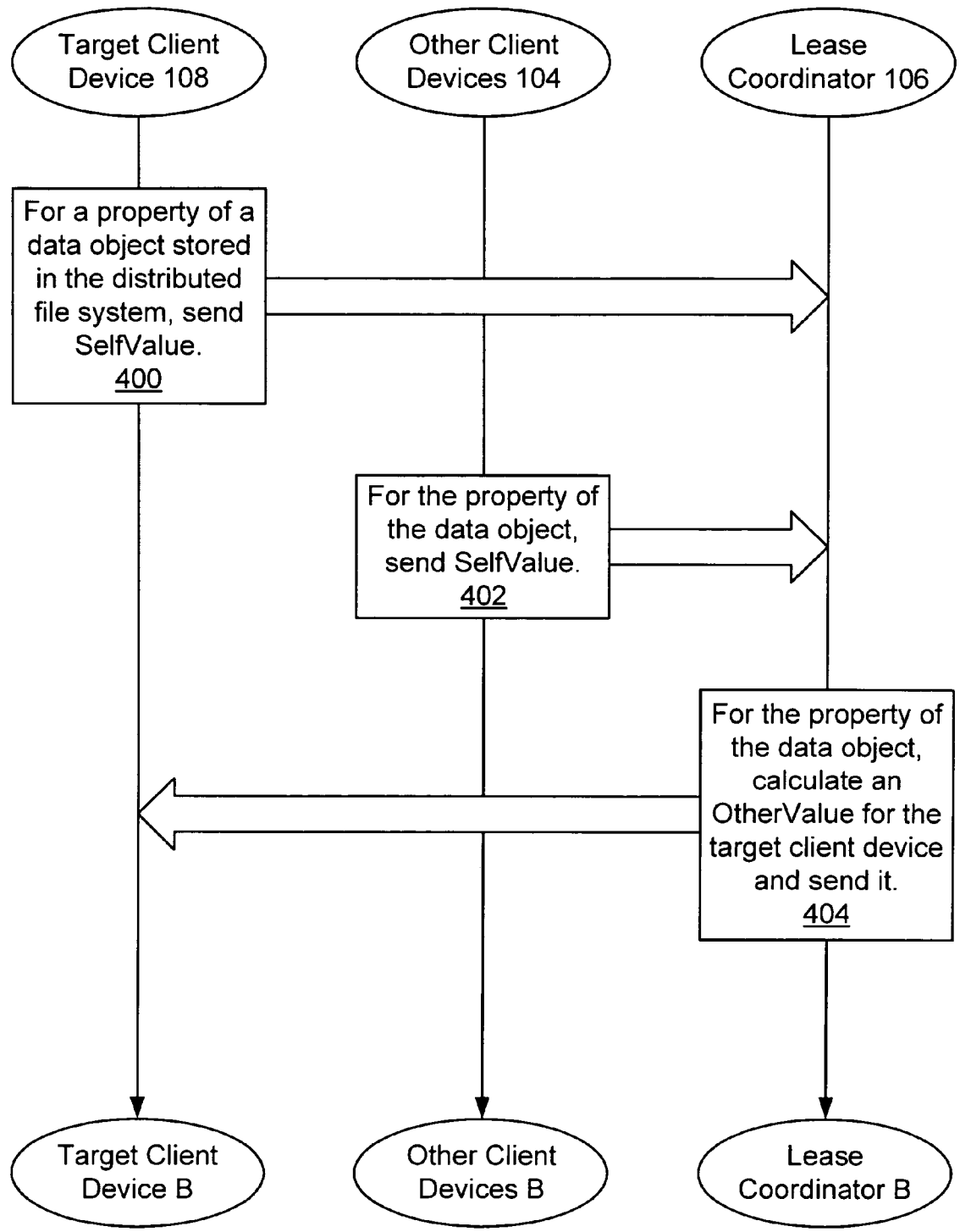

METHOD AND SYSTEM FOR PROTECTING THE CONSISTENCY OF INFORMATION IN A DISTRIBUTED FILE SYSTEM

TECHNICAL FIELD

The present invention is related generally to distributed file systems, and, more particularly, to protecting the consistency of information in a distributed file system.

BACKGROUND OF THE INVENTION

The information stored in a distributed file system is spread out over multiple, networked, computing devices and is usually made available to multiple client devices. Keeping the stored information self-consistent as it changes and coordinating access to it when multiple devices wish to access, and to potentially change, the information are two of the major functions of a distributed file system. In the past, these functions were performed by a central server that could ensure its own self-consistency. Today, however, serverless architectures that have no central authority are proliferating, but they still need to coordinate access and to ensure that their stored information remains consistent.

Microsoft's FARSITE™ is one example of a serverless, distributed file system. Logically, FARSITE™ acts like a central file server, but physically computation, communication, and storage are distributed among client computers in the system. Some or all of the client devices act together in small groups to perform functions analogous to those performed by the central server in a conventional, server-based, distributed file system. Because they perform the functions of a server, such groups are often referred to as "servers" for purposes of the present discussion. For a detailed discussion of FARSITE™, please see U.S. patent application Ser. No. 10/005,629, "A Serverless Distributed File System," filed on Dec. 5, 2001, and incorporated herein by reference in its entirety.

For performance reasons, it is advantageous for distributed file systems to perform a large fraction of their operations directly on the client devices that initiate the operations, rather than sending each operation individually back to a server for remote processing. However, this presents a problem in keeping the file-system data consistent: If two clients make conflicting changes to the file-system state at the same time, then the system enters an inconsistent state. One approach to this problem is to create resolution mechanisms that attempt to rectify inconsistencies after they occur. Thus, the distributed file system is allowed to enter an inconsistent state and is subsequently corrected, to whatever extent that is possible. A different approach is to prevent the inconsistency from occurring by restricting the operations performed by each client to those that do not conflict with operations performed by other clients. FARSITE™ takes this latter approach.

FARSITE™ protects file-system consistency by means of leases. A lease grants a client permission to observe or to modify a particular subset of the global file-system data fields. For example, a client may receive a lease that permits it to modify the contents of a particular file. This is commonly called a "write lease." Alternatively, the client may receive a lease that permits it to observe the contents of a particular file. This is called a "read lease." To protect consistency, if any client is granted a write lease on the contents of a particular file, then no other client may be granted a read lease on the contents of that same file. By contrast, it is permissible for multiple clients to have read leases on the contents of a single file as long as no client has a write lease on the file. This is known as "single writer, multiple reader" (SWMR) semantics.

When a client attempts an operation, it does not necessarily know what leases it will need for the operation. For example, Microsoft's WINDOWS™ file-system semantics specify that a directory may not be deleted if it contains any files or subdirectories (these are commonly called "children" of the directory). Thus, if a directory has no children (and if several other conditions are met), then the correct response to a delete-directory operation is to delete the directory and to return a success code. On the other hand, if the directory has at least one child, then the correct response to a delete-directory operation is to return an error code and to not delete the directory. The client requesting the delete-directory operation may not initially know whether the directory has any children, so it does not know whether it requires a read lease on every child field (all indicating the absence of a child) or if it requires a read lease on one child field (indicating the presence of a child). Furthermore, since there are other conditions that must hold for this operation to succeed, it is possible that no child leases are required at all, because the operation will fail for an unrelated reason. Therefore client lease requests are said to often have "proof-or-counterexample" semantics. This means that the server is obligated to provide either proof that an operation will succeed (by issuing all of the leases necessary for the successful completion of the operation) or a counterexample showing at least one cause for the operation to fail (this is typically a single read lease). Since the server generally has more information about this than does the client, the server is in a better position than the client to determine which leases the client needs (if any).

Traditionally, if any data field in a distributed file system is leased to clients, then the data field is protected by an SWMR lease or by a degenerate form thereof. Degenerate forms include read-only leases, which protect data that clients are never allowed to modify, and single read/write leases, which do not allow multiple clients even for read access. All of these various classes of leases are called "shared-value leases" because the lease governs access to a single value that is shared among all clients.

However, shared values represent a poor abstraction for some file-system data fields. One example is the set of handles that a particular client has open on a file, which needs to be a protected value for observing WINDOWS™ deletion semantics. In a WINDOWS™-compatible file-system, file deletion follows this procedure:

A client opens a handle to a file and uses this handle to set the "deletion disposition" bit on the file.

Once the deletion disposition is set, no new handles may be opened on the file.

Existing handles on the file can be closed normally, and when the last handle is closed, then the file is unlinked from the file-system directory structure.

While the implementation of this procedure is straightforward on a centralized file server, it is more complicated in a distributed file system. When a client closes a handle on a file, the client must know whether it is closing the last handle that any client has open on the file. If an SWMR lease were used for the set of handles open on a file, then deletion would proceed as follows:

When a client closes its locally last handle on a file, and if the deletion disposition (protected by an SWMR lease) is set, then the client must have either a read lease on every other client's handle-set fields (all indicating the absence of an open handle on the file) or a read lease on one particular client's handle-set field (indicating the presence of at least one open handle on the file).

With this information, the client can determine whether it should unlink the file.

Using a shared-value lease in this application causes two problems: security and performance. Security suffers because a client can see which handles other clients have open on a file, which is information that the client should not be privy to. Performance suffers because when a client X holds a read lease on the handles open by another client Y, then client Y is unable to concurrently hold a write lease that would enable it to change the handles it has open.

SUMMARY OF THE INVENTION

In view of the foregoing, the present invention provides "black-box leases" that protect information consistency and that allow for information sharing in a distributed file system while hiding from a client information about other clients' use of the file system. This information hiding also allows greater concurrency because changes to the file system are permitted as long as they do not affect the leases as observed by the clients.

For each data field protected by a black-box lease, a client has a two-value data structure: SelfValue represents the client's intended use of the data field, and OtherValue is an aggregation of the other clients' intended uses of that data field. Knowing only this aggregate OtherValue, but without knowing any specifics of the other clients' usage patterns, the client knows how it may use the data field without adversely affecting the consistency of data in the distributed file system.

Clients send their SelfValues to a central lease coordinator (the "black box," a logical, but not necessarily a physical, construct). The lease coordinator takes the SelfValues and calculates an OtherValue specific to each client. The OtherValues are then sent to the clients.

In general, the SelfValues and OtherValues can be of any type, and the aggregation performed by the lease coordinator can be any function. Clients do not need to know what the function is; they only need to know what rules to follow when using the OtherValues that they receive. In one embodiment, the aggregation is a Boolean disjunction (OR) of the SelfValues. Other aggregation functions are discussed in the specification.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 4a and 4b together are a logic flow diagram of an exemplary black-box lease exchange between a target client device and a lease coordinator;

DETAILED DESCRIPTION OF THE INVENTION

Figure 1:
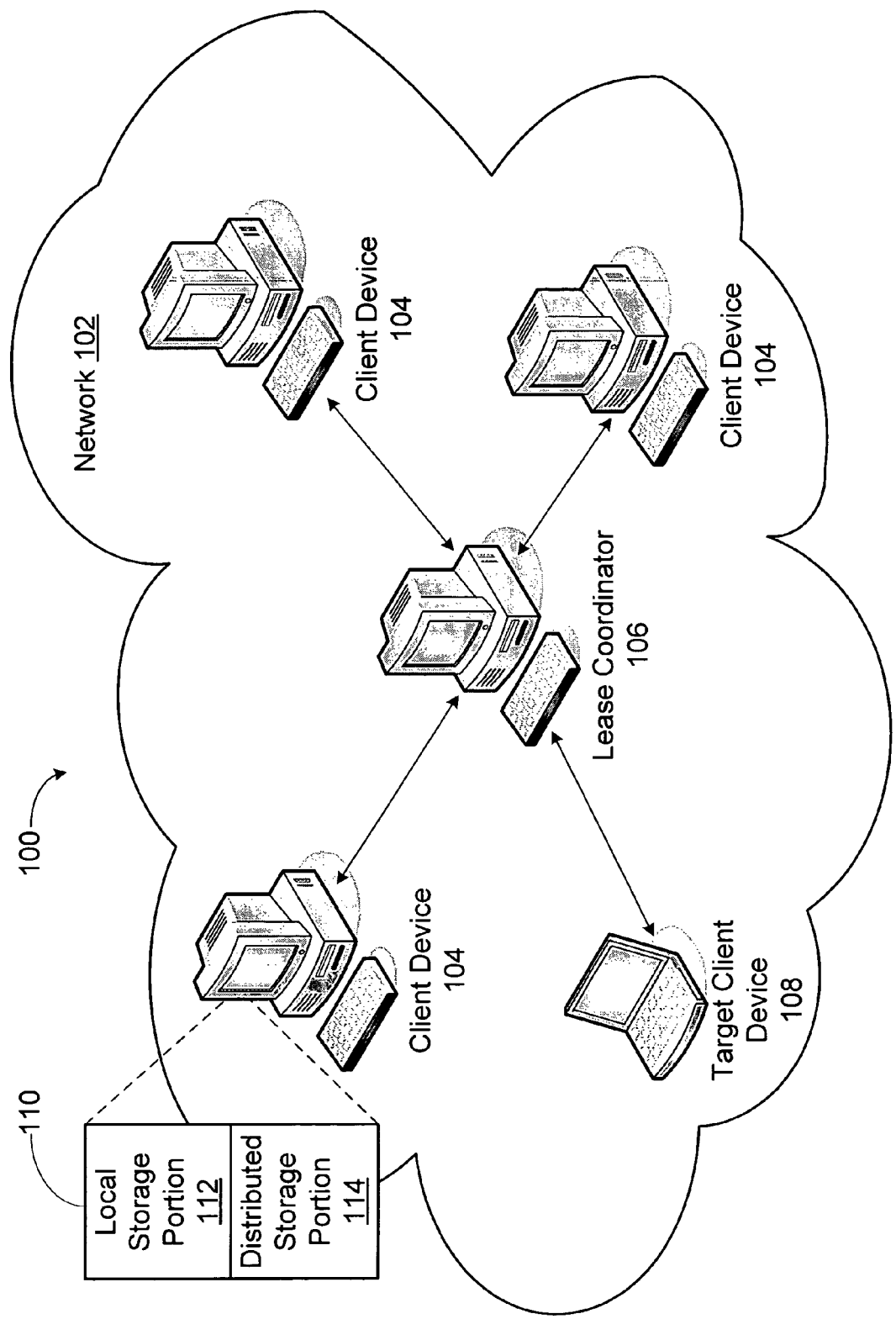
FIG. 1 is a block diagram of a serverless, distributed file system showing client devices and a lease coordinator.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the environment surrounding the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
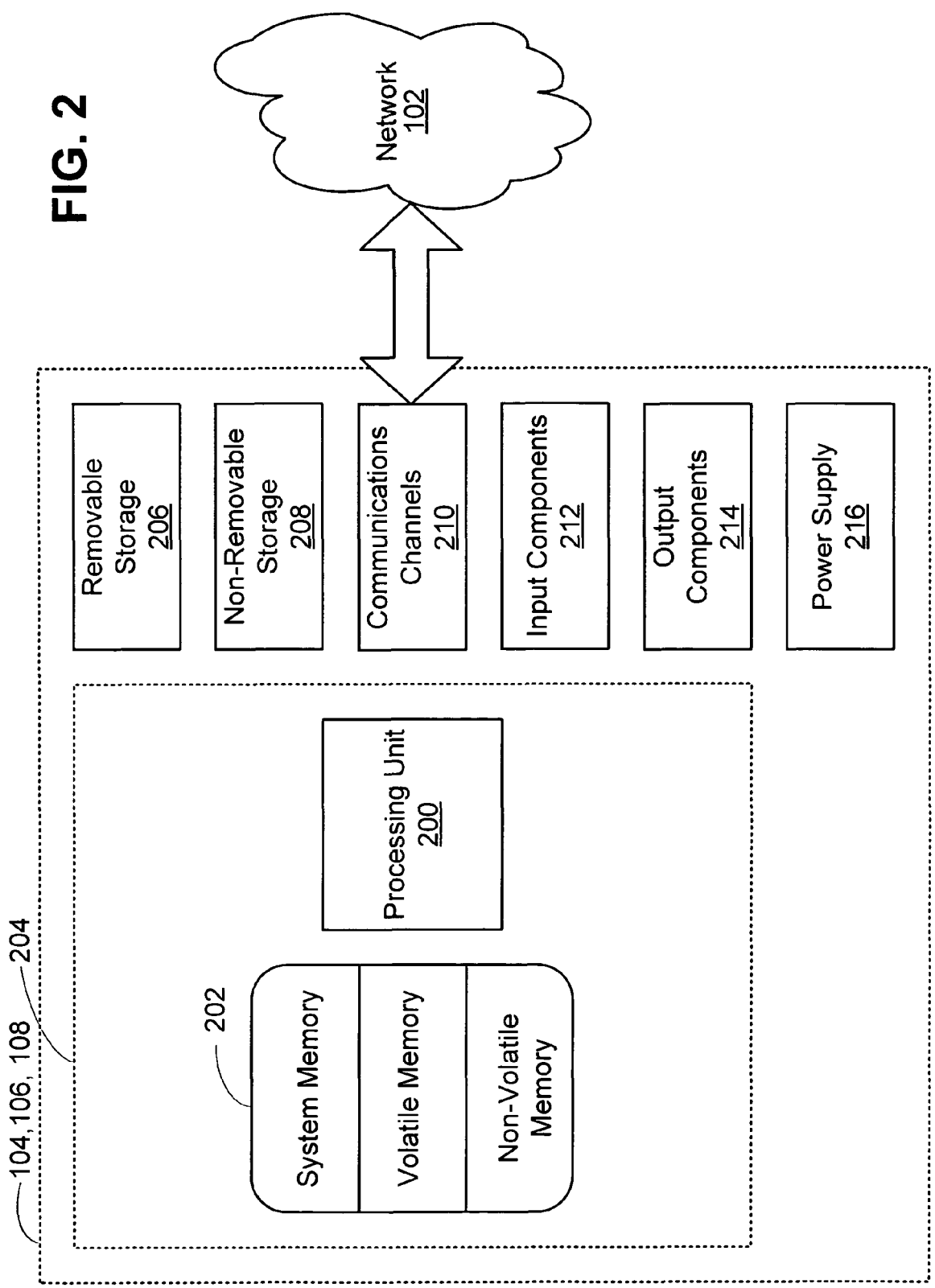
FIG. 2 is a schematic diagram generally illustrating an exemplary computing device that supports the present invention.

FIGS. 1 and 2 present a framework for the following discussion of black-box leases. In FIG. 1, a serverless, distributed file system 100 consists of a data communications network 102 that ties together client computing devices 104. A lease coordinator 106, which may also be a client device 104, prepares the black-box leases that protect the consistency of data objects stored in the distributed file system 100. By "data object" is meant anything stored in the distributed file system 100 such as a data file, the contents of a data file, a data folder, or a data field in a database. One of the clients in FIG. 1 is called the "target" client 108 simply to distinguish its role in the following discussion.

Each computing device 104, 106, and 108 in the serverless, distributed file system 100 can perform three functions: (1) It can be a client for a local user; (2) It can be a repository for data objects stored in the distributed file system 100; and (3) It can be a member of a group of computing devices that maintains one or more directories. The set of computing devices 104, 106, and 108 that participate in the distributed file system 100 can change over time, allowing new devices to join the system 100 and other devices to leave.

At least some of the clients 104 include a mass storage system 110 consisting of a local storage portion 112 and a distributed storage portion 114. The local storage portion 112 contains data used for the local operation of the client 104, while the distributed storage portion 114 contains data for the serverless, distributed file system 100. Through software of the distributed file system 100, data objects in the distributed storage portion 114 are made available to other clients 104, 106, and 108 in the network 102.

Microsoft's FARSITE™ is one example of software for a serverless, distributed file system 100 and is used to illustrate many of the concepts of the present invention. However, the present invention is not limited in applicability to FARSITE™ or even to serverless, distributed file systems in general.

FIG. 1's network 102 can support any of a wide variety of data communications technology. The network 102 may include public portions (such as the Internet) and private portions (such as a private corporate local area network). The network 102 may be implemented using any one or more of a wide variety of well known communications media and can support any of a wide variety of well known communications protocols such as TCP/IP, IPX/SPX, and NetBEUI.

The serverless, distributed file system 100 stores one or more copies of each data object in the distributed storage portions 114 of one or more of the computing devices 104, 106, and 108. When copies of the data object are stored on multiple devices, a user can retrieve the data object even if one of the devices on which the data object is stored becomes unavailable. The degree of replication can depend upon the type of data object. For example, more copies of a directory entry may be saved than copies of a data file. In one implementation, directory entries are stored on computing devices 104, 106, and 108 that are part of a Byzantine fault-tolerant group. (Please see U.S. patent application Ser. No. 10/005,629 for more details.) The user creating a data object typically does not control where the data object is stored and may not even know where it is stored.

Control of the serverless, distributed file system 100 is shared by components on the computing devices 104, 106, and 108 which obviates the need for a centralized server. These components determine where data objects are stored and how many copies of each data object are created for storage. The choice of where to store a particular data object depends upon numerous considerations including the number of devices in the distributed file system 100, the size of the distributed storage portions 114, how many copies of the data object are saved, the number of data objects already stored on each device 104, 106, and 108, and so on.

The serverless, distributed file system 100 is designed to prevent unauthorized users from reading stored data objects. In order to implement such security, data objects, including file and directory names, are stored in an encrypted form, and only authorized users are given the decryption key. When a new data object is created, the computing device 104, 106, or 108 where the data object is created encrypts the object before sending it to any other devices for storage. If, for example, the target client 108 stores a data object created by a user of another device, then a user of the target client 108 can only access the data object if that user is authorized to do so.

The serverless, distributed file system 100 can employ a hierarchical storage structure, having one or more namespace roots as well as multiple subtrees under each namespace root. The management of different subtrees can be delegated to different groups of computing devices 104, 106, and 108 which prevents any one computing device 104, 106, or 108 managing a namespace root or a subtree from becoming overburdened.

The computing devices 104, 106, and 108 of FIG. 1 may be of any architecture. FIG. 2 is a block diagram generally illustrating an exemplary computer system that supports the present invention. The computer system of FIG. 2 is only one example of a suitable environment and is not intended to suggest any limitation as to the scope of use or functionality of the invention. Neither should the computing devices 104, 106, and 108 be interpreted as having any dependency or requirement relating to any one or combination of components illustrated in FIG. 2. The invention is operational with numerous other general-purpose or special-purpose computing environments or configurations. Examples of well known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs, minicomputers, mainframe computers, and distributed computing environments that include any of the above systems or devices. In their most basic configurations, the computing devices 104, 106, and 108 typically include at least one processing unit 200 and memory 202. The memory 202 may be volatile (such as RAM), non-volatile (such as ROM or flash memory), or some combination of the two. This most basic configuration is illustrated in FIG. 2 by the dashed line 204. The computing devices 104, 106, and 108 may have additional features and functionality. For example, they may include additional storage (removable and non-removable) including, but not limited to, magnetic and optical disks and tape. Such additional storage is illustrated in FIG. 2 by removable storage 206 and by non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing devices 104, 106, and 108. Any such computer-storage media may be part of the computing devices 104, 106, and 108. The computing devices 104, 106, and 108 may also contain communications channels 210 that allow them to communicate with other devices, including devices on the network 102. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include optical media, wired media, such as wired networks and direct-wired connections, and wireless media such as acoustic, RF, infrared, and other wireless media. The term "computer-readable media" as used herein includes both storage media and communications media. The computing devices 104, 106, and 108 may also have input devices 212 such as a touch-sensitive display screen, a hardware keyboard, a mouse, a voice-input device, etc. Output devices 214 include the devices themselves, such as the touch-sensitive display screen, speakers, and a printer, and rendering modules (often called "adapters") for driving these devices. All these devices are well know in the art and need not be discussed at length here. The computing devices 104, 106, and 108 each has a power supply 216.

The present invention provides black-box leases that protect information consistency and that allow for information sharing in the distributed file system 100. Unlike traditional "shared-value leases" that are used for these same purposes, with black-box leases values that are particular to distinct clients 104 are partitioned among clients 104 by the lease mechanism itself, rather than in an ad hoc manner on top of a shared-value lease mechanism.

Figure 3:
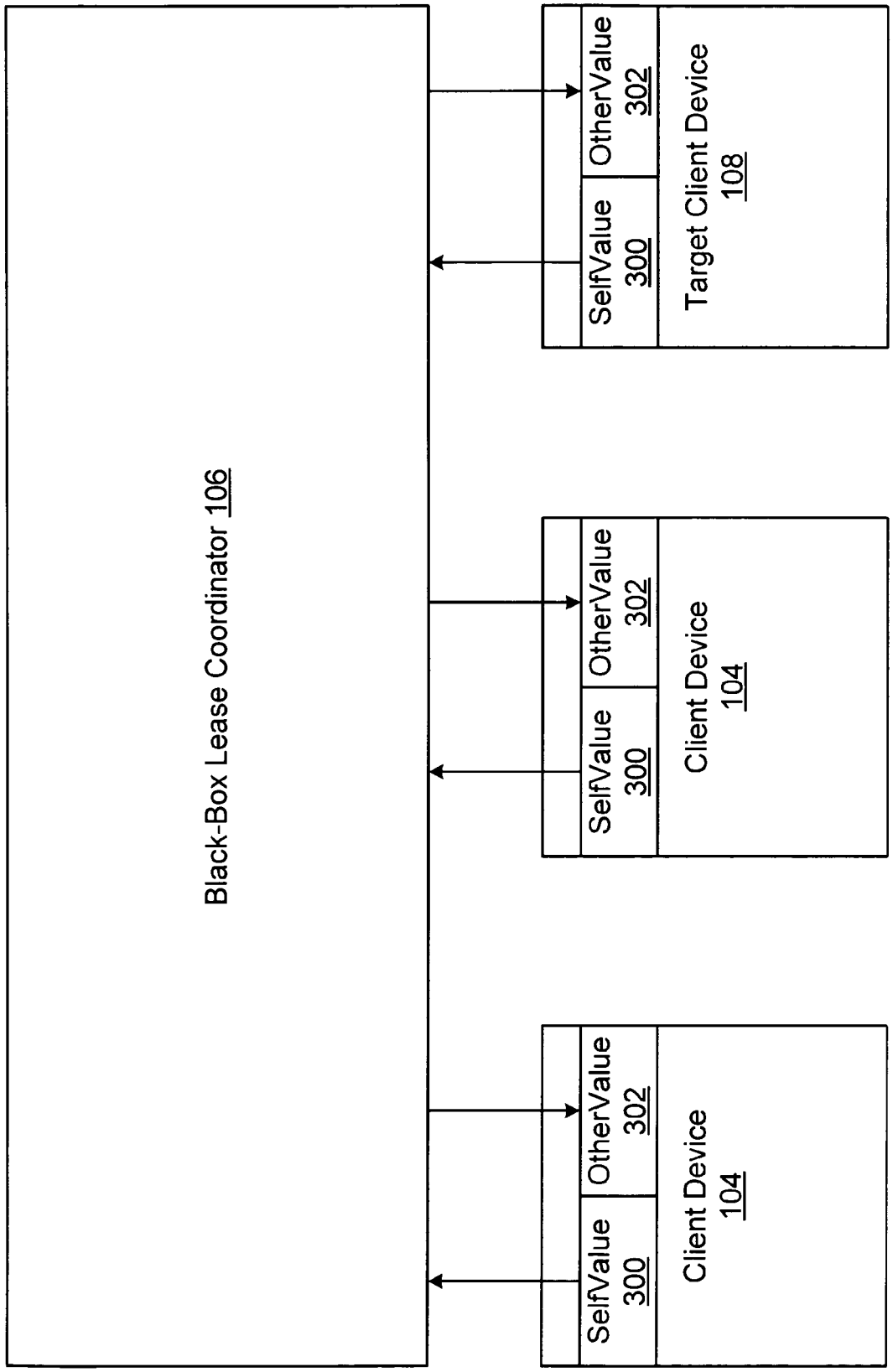
FIG. 3 is a block diagram illustrating the interaction of SelfValues and OtherValues when creating black-box leases.

A black-box lease presents to a target client 108 an aggregation of the values of other clients 104. For each data field protected by a black-box lease, each client 104 and 108 has two sub-fields: SelfValue 300 and OtherValue 302, as illustrated in FIG. 3. The SelfValue 300 holds the client-specific value for a particular client 104 or 108, and the OtherValue 302 holds the aggregation of the SelfValues of other clients in the set consisting of clients 104 and client 108. In the general case, the SelfValues 300 and OtherValues 302 can be of any type, and the aggregation function performed by the black-box lease coordinator 106 can be any function. The clients 104 and 108 do not need to know what this aggregation function is; they only need to know what rules to follow when using the OtherValues 302 that they observe.

Figure 4B:
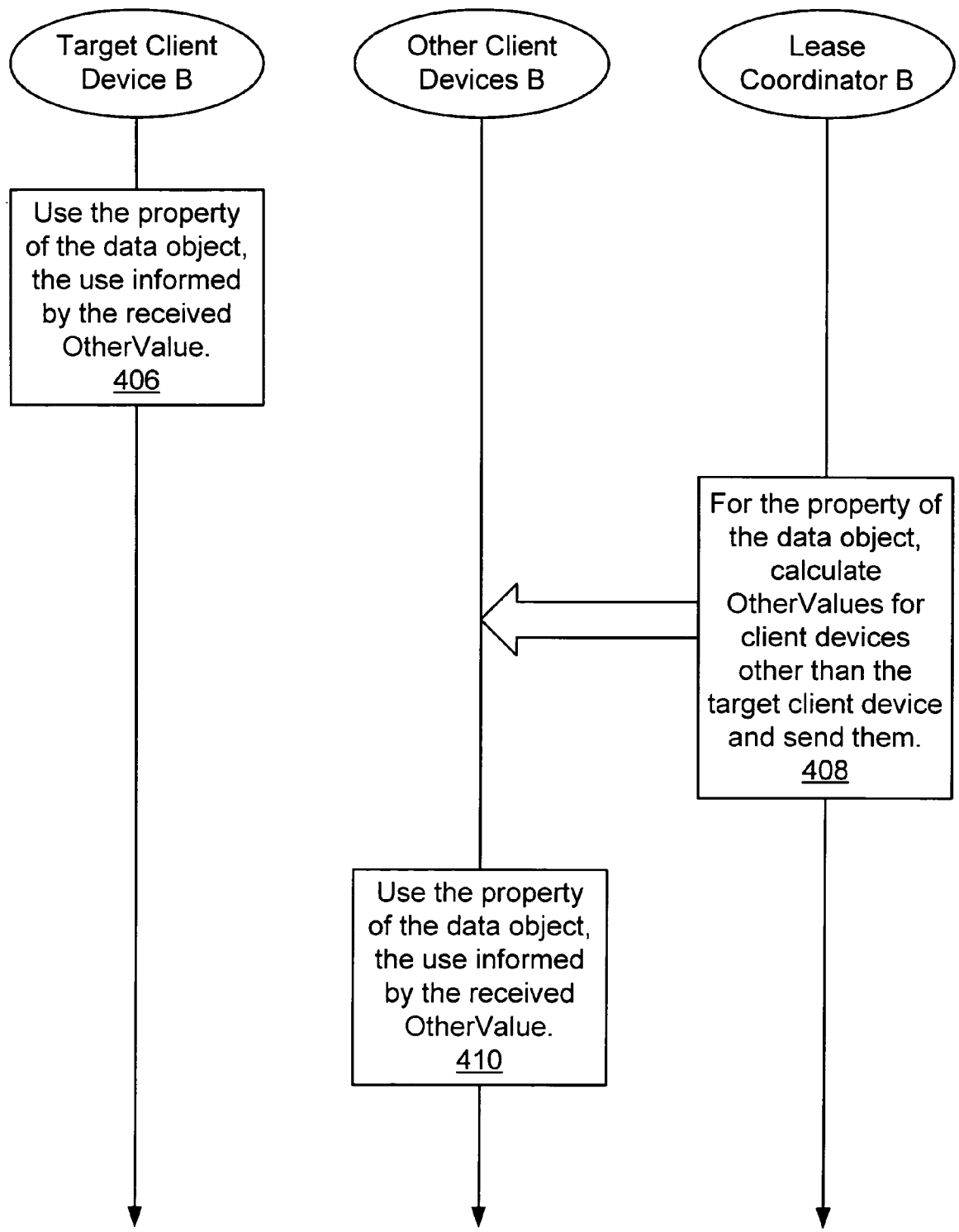

The logical exchange in FIGS. 4a and 4b is an example of how clients 104 and 108 work with a lease coordinator 106 to create a black-box lease. For a given data object (or, in some embodiments, for a given property of a given data object) stored in the distributed file system 100, one client, called the target client 108 for clarity in this discussion, sends its SelfValue 300 in step 400 of FIG. 4a to the lease coordinator 106. As mentioned just above, the particular type of the SelfValue 300 differs in differing embodiments, but in general the SelfValue 300 represents the target client 108's intended use of the data object.

(Strictly speaking, step 400 is optional because, in some embodiments, the lease coordinator 106 does not use the SelfValue 300 sent by the target client 108 when calculating an OtherValue 302 for that target client 108. However, for symmetry's sake, the example of FIGS. 4a and 4b treats the target client 108 just like any other client 104. In the normal course of things, each client is the "target client" 108 for its own black-box leases and is simply a non-target client 104 when providing input for leases for any other client 104.)

The other clients 104 also send, in step 402, their own SelfValues 300 to the lease coordinator 106. Once it has the SelfValues 300, the lease coordinator 106 performs an aggregation function on the SelfValues 300 other than the one received from the target client 108. (In some embodiments the lease coordinator 106 includes the SelfValue 300 received from the target client 108. See the parenthetical paragraph just above.) The result of the aggregation function is an OtherValue 302 specific to the target client 108 that represents, in aggregate, the SelfValues of the other clients 104. That is to say, the OtherValue 302 represents the aggregate of the intended uses of those other clients 104.

When the target client 108 receives its OtherValue 302, it examines it and from its value knows what it is permitted to do with the data object. In step 406 of FIG. 4b, the target client 108 acts in accordance with the "permission" represented by its received OtherValue 302.

Meanwhile, the lease coordinator 106 can calculate OtherValues specific to other clients 104 in step 408. These other clients 104 act in accordance with their received OtherValues in step 410.

Figure 5:
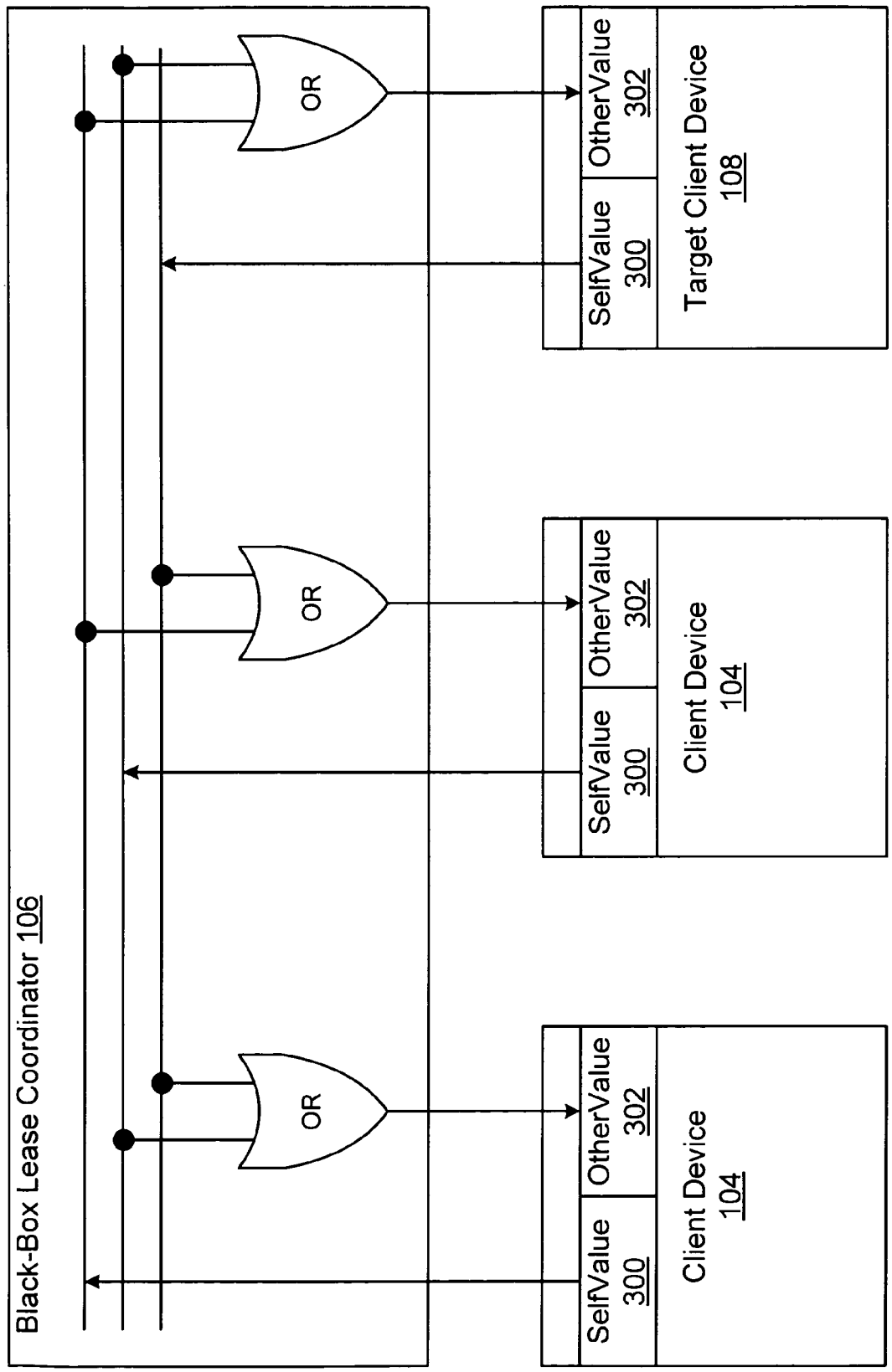
FIG. 5 is a logic diagram of one embodiment of the aggregation function performed by the lease coordinator in creating black-box leases.

Using the FARSITE™ system as an exemplary embodiment, black-box leases protect the following fields of each data file: the handles that a client 104 has open on the data file and the modes for which a client 104 has the data file open. In total, FARSITE™ uses black-box leases for seven distinct fields of each file. For all seven of these fields, FARSITE™ uses black-box leases with the same SelfValue 300 and OtherValue 302 types and the same aggregation function. As illustrated in FIG. 5, the SelfValues 300 and the OtherValues 302 in FARSITE™ are Boolean, and, in step 404 of FIG. 4a, the lease coordinator 106 performs a disjunction (logical OR) aggregation on the SelfValues of the other clients 104.

For an example using the FARSITE™ embodiment, each file has a black-box lease associated with the set of handles each client has open on the file. When a client opens its first handle on the file, it sets its SelfValue 300 for this black-box lease to True. Even if the client opens more handles on the file, the client does not change its SelfValue 300. When the client closes its handles on the file, it does not change its SelfValue 300 until it is closes the last of its handles, in which case it sets its SelfValue 300 to False. A client determines whether any other client has a SelfValue of True by looking at its own OtherValue 302. If its OtherValue 302 is True, then at least one other client has a SelfValue 300 of True; if its OtherValue 302 is False, then all other clients have a SelfValue 300 of False. This follows from the use of disjunction as the aggregation function.

Following this same example, file deletion proceeds as follows: When a client closes its locally last handle on the file, and if the deletion disposition (protected by a shared-value lease) is set, then the client looks at its OtherValue 302 of the black-box lease associated with the open handles on the file. If the OtherValue 302 is False, then no other client has an open handle on the file, and the client should unlink the file. If the OtherValue 302 is True, then at least one other client has at least one open handle on the file, and the client should not unlink the file.

Notice how in this example, the black-box lease solves the security and performance issues that arose when using shared-value leases for the clients' open handles. There is no security violation because each client cannot see which other clients have handles open on the file: all a client can tell is whether at least one other client has a handle open on the file. There is no performance problem because no other client is prevented from closing its last handle on the file, unless it is the very last handle held by any other client in the entire system. Furthermore, note that the black-box lease inherently provides the proof-or-counterexample semantics described in the Background.

When a handle is opened on a file in WINDOWS™, it is opened for a specific set of access flags and sharing flags. As for access flags, the file's contents can be read via a handle only if the handle has been opened with the AccessRead flag; the file's contents can be written via a handle only if the handle has been opened with the AccessWrite flag; and the file's deletion disposition can be set via a handle only if the handle has been opened with the AccessDelete flag. Sharing flags specify what access flags are permitted to other handles open on the same file. A handle cannot be opened with the AccessRead flag if another handle is open on the same file and the other handle has not been opened with the ShareRead flag. Similarly, a handle cannot be opened with the AccessWrite or AccessDelete flags if any other handle open on the file was not opened with the ShareWrite or ShareDelete flag, respectively.

In the FARSITE™ embodiment, on the other hand, the file-sharing flags have the inverse meaning from those in WINDOWS™. Negating the WINDOWS™ file-sharing flags yields the three flags used internally in FARSITE™: ExcludeRead, ExcludeWrite, and ExcludeDelete.

FARSITE™'s three access and three exclude flags are collectively called the "mode flags."

The FARSITE™ rules for determining mode conflicts are as follows, where X is Read, Write, or Delete:

A handle cannot be opened for AccessX if any other handle on the file is open for ExcludeX.

A handle cannot be opened for ExcludeX if any other handle on the file is open for AccessX.

To implement these rules with black-box leases, for each mode, each file is given a black-box lease associated with the set of handles each client has open on the file with the given mode. A client determines whether any other client has a conflicting mode by looking at its OtherValue 302 for the mode. If its OtherValue 302 is True, then at least one other client has a handle open with the given mode; if its OtherValue 302 is False, then no other client has a handle open with the given mode.

Each client's SelfValue 300 is protected by a SelfWrite lease. The client is allowed to change its SelfValue 300 from True to False, or from False to True, if and only if it holds the associated SelfWrite lease. Each client's OtherValue 302 is protected by an OtherRead lease. The client is able to observe the Boolean state of its OtherValue 302 if and only if it holds the associated OtherRead lease.

The black-box lease coordinator 106 grants an OtherRead lease to a client under either of two conditions: (1) At least one other client has its SelfValue 300 stuck True, or (2) All other clients have SelfValues 300 that are stuck False. In this context, "stuck" means that the other client does not hold a SelfWrite lease, and thus it is not permitted to change its SelfValue 300. If a client's SelfValue 300 is stuck True, then any other client can be granted an OtherRead lease with an OtherValue 302 of True. If all clients other than some client X have their SelfValues 300 stuck False (regardless of the SelfWrite and SelfValue 300 of client X), then client X can be granted an OtherRead lease with an OtherValue 302 of False.

FARSITE™'s SelfValue 300 and OtherValue 302 types and aggregation function constitute implementation choices. Other embodiments are possible and are discussed below. Before proceeding to those, however, here is a summary of the FARSITE™ system's characteristics:

| | |
|---|---|
| SelfValue 300 type: | Boolean |
| OtherValue 302 type: | Boolean |
| Aggregation Function: | Or |
| Shield: | A single SelfValue stuck True |

In the FARSITE™ embodiment, a client Y is "shielded" from the SelfValue 300 of another client X if some third client Z has a SelfValue 300 that is stuck True. This is because the aggregation function is the disjunction of the SelfValues of all other clients: Therefore, a stuck True SelfValue 300 of client Z causes client Y to see an OtherValue of True, regardless of client X's SelfValue. In such a case, we refer to client Z as a "shield" for client X's SelfValue. This concept of shield also applies, mutatis mutandis, to many of the following alternative embodiments.

The characteristics of a first alternative embodiment are:

| | |
|---|---|
| SelfValue 300 type: | Boolean |
| OtherValue 302 type: | Boolean |
| Aggregation Function: | And |
| Shield: | A single SelfValue stuck False |

In a second alternative embodiment:

| | |
|---|---|
| SelfValue 300 type: | Non-negative integer |
| OtherValue 302 type: | Non-negative integer |
| Aggregation Function: | Minimum |
| Shield: | A single SelfValue stuck at 0 |

For a third alternative embodiment:

| | |
|---|---|
| SelfValue 300 type: | Non-negative integer |
| OtherValue 302 type: | Non-negative integer |
| Aggregation Function: | Maximum |
| Shield: | None |

A fourth alternative embodiment has the following characteristics:

| | |
|---|---|
| SelfValue 300 type: | Non-negative integer |
| OtherValue 302 type: | Non-negative integer |
| Aggregation Function: | Sum |
| Shield: | None |

Finally, a fifth alternative embodiment provides:

| | |
|---|---|
| SelfValue 300 type: | Elements from a finite set of cardinality C |
| OtherValue 302 type: | A subset of the finite set |
| Aggregation Function: | Union |
| Shield: | C distinct stuck SelfValues |

This fifth alternative embodiment might benefit from an example. Consider the set {X, Y, Z}. If the SelfValue 300 of one client is stuck at X, and the SelfValue 300 of a second client is stuck at Y, and the SelfValue 300 of a third client is stuck at Z, then the aggregation function produces the union {X, Y, Z} no matter the SelfValue 300 of any other client. Thus, this circumstance constitutes a shield.

In another embodiment, SelfWrite leases are more expressive. In the FARSITE™ embodiment, a SelfWrite lease grants a client 104 the ability to write any legal value (that is, True or False). However, a more expressive lease could allow the client 104 to write a True but not a False, and another lease could allow the client 104 to write a False but not a True. Another example uses the Maximum aggregation function of the third alternative embodiment above. As described above, the Maximum function over non-negative integers does not have a shield. However, in an embodiment with two further leases (call them SelfWriteIncrease and SelfWriteDecrease), if the SelfValue 300 of any client is stuck at the currently largest value, then that client shields a second client from SelfWriteDecreases by any third client. This particular embodiment still does not provide a shield for SelfWriteIncrease, because increasing a SelfValue can increase the computed Maximum.

Figure 6:
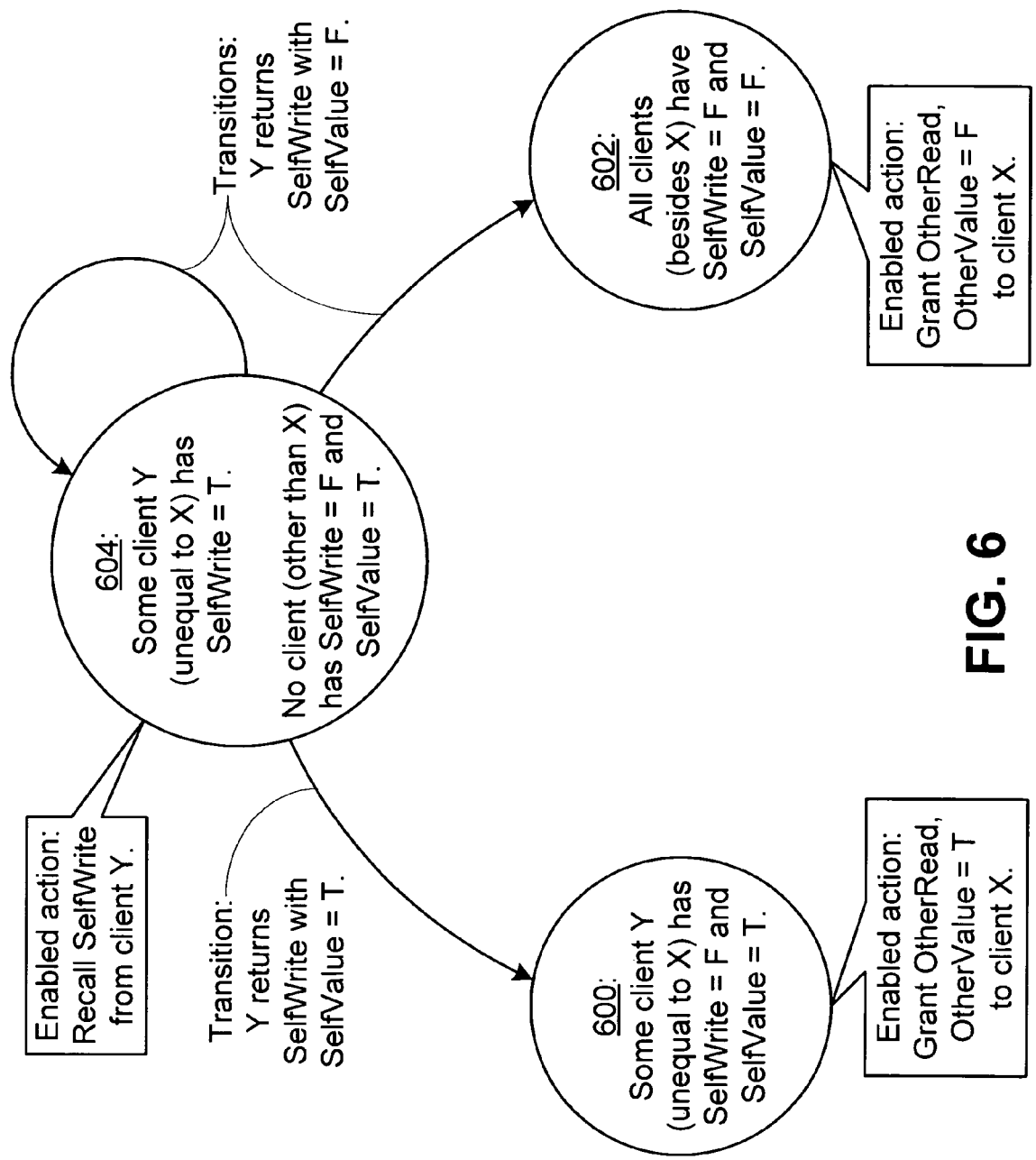
FIG. 6 is a logical state diagram of the lease coordinator responding to a request for an OtherRead lease, according to one embodiment.

FIG. 6 shows a state diagram of possible behaviors of the lease coordinator 106 in response to a request by client X for an OtherRead lease. In state 600, some client Y (which is not the same as client X) does not hold a SelfWrite lease, and its SelfValue 300 is True: In this state 600, the lease coordinator 106 can grant client X an OtherRead lease with an OtherValue 302 of True. In state 602, all clients other than client X do not hold SelfWrite leases, and their SelfValues 300 are all False: In this state 602, the lease coordinator 106 can grant client X an OtherRead lease with an OtherValue 302 of False. In state 604, neither of the above conditions is satisfied; there is therefore at least one client Y (not the same as client X) that holds a SelfWrite lease. In this state 604, the lease coordinator 106 can recall the SelfWrite lease from client Y. When client Y returns its SelfWrite lease, it tells the lease coordinator 106 its associated SelfValue 300. If client Y's SelfValue is True, then the state changes to 600, and the lease coordinator 106 can grant the OtherRead lease to client X. If client Y's SelfValue is False, then the state changes to 602 if no other clients hold SelfWrite leases. The state remains in 604 if at least one other client holds a SelfWrite lease.

The conditions under which the lease coordinator 106 may grant a SelfWrite lease to a client are somewhat more involved than those for granting an OtherRead lease. The lease coordinator 106 can grant a SelfWrite lease to client X if every other client either "ignores" client X's SelfValue 300 or is shielded from client X's SelfValue 300. A client Y is said to ignore client X's SelfValue 300 if client Y does not have an OtherRead lease; therefore, it is not able to observe any changes to client X's SelfValue 300. A client Y is shielded from client X's SelfValue 300 if some third client Z has a SelfValue 300 that is stuck True.

Figure 7:
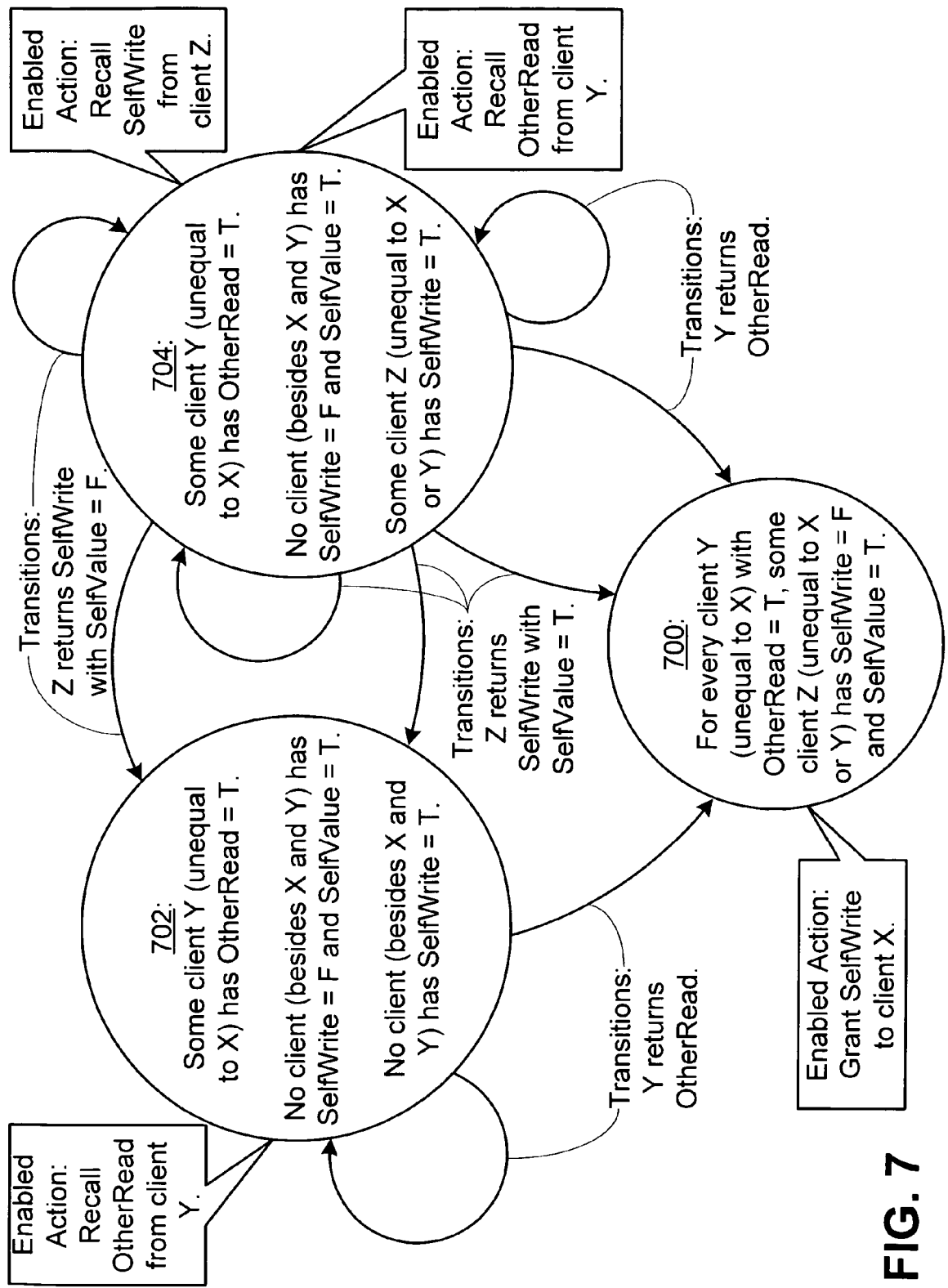
FIG. 7 is a logical state diagram of the lease coordinator responding to a request for a SelfWrite lease, according to one embodiment.

FIG. 7 is a state diagram of possible behaviors of the lease coordinator 106 in response to a request by client X for a SelfWrite lease. In state 700, the lease coordinator 106 can grant a SelfWrite lease to client X because every client Y that does not ignore client X's SelfValue 300 is shielded by some third client Z whose SelfValue 300 is stuck True. Note that it is possible for two clients to act as shields for each other; however, it is not possible for a client to act as a shield for itself, because the aggregation function for each client does not include that client's own SelfValue 300. (See note above on step 400 of FIG. 4a.)

Three conditions hold in state 702: (1) At least one client Y is not ignoring client X's SelfValue 300; (2) No other client shields client Y from client X's SelfValue 300; and (3) There are no other clients that could potentially become shields because no other client has a SelfWrite lease that could be recalled. Therefore, the only action allowed in this state 702 is for the lease coordinator 106 to recall the OtherRead lease from client Y. When client Y returns its OtherRead lease, the state changes to 700 if no other client holds an OtherRead lease, and the state remains in 702 if at least one other client holds an OtherRead lease.

State 704 differs from state 702 in the third condition enumerated above: (3) There is at least one client Z that holds a SelfWrite lease. As far as the lease coordinator 106 knows, it might be that client Z's SelfValue 300 is True, in which case recalling its SelfWrite lease could cause client Z to become a shield for client Y. (Note that the lease coordinator 106 does not know client Z's SelfValue 300 because client Z holds a SelfWrite lease which permits client Z to change its SelfValue 300 without informing the lease coordinator 106.) In this state 704, the lease coordinator 106 is not only allowed to recall client Y's OtherRead lease as in state 702, but it can also recall client Z's SelfWrite lease.

When client Z returns its SelfWrite lease, it tells the lease coordinator 106 its associated SelfValue 300. If client Z's SelfValue 300 is True, then client Z acts as a shield for every client except for client Z itself; thus, the state changes to 700 if client Z ignores or is shielded from client X's SelfValue 300, and it either remains in state 704 or changes to state 702 otherwise. Specifically, if some other client holds a SelfWrite lease, then the state remains in 704; if not, then the state changes to 702. If client Z's SelfValue 300 is False, then the state changes to 702 if no other client holds a SelfWrite lease, and the state remains in 704 if at least one other client holds a SelfWrite lease.

Figure 8:
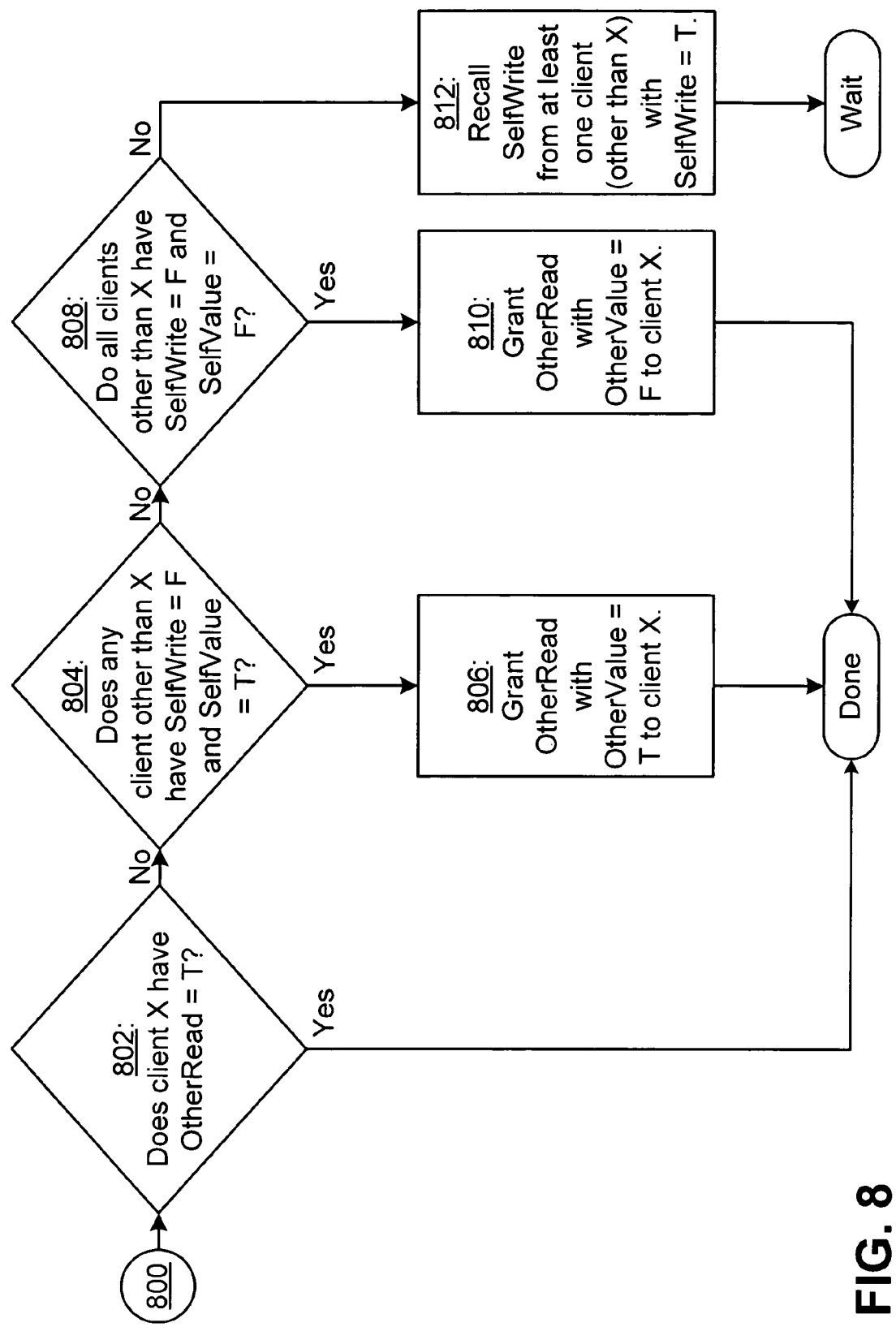
FIG. 8 is a logical flow diagram of the lease coordinator responding to a request for an OtherRead lease, according to another embodiment.
Figure 9:
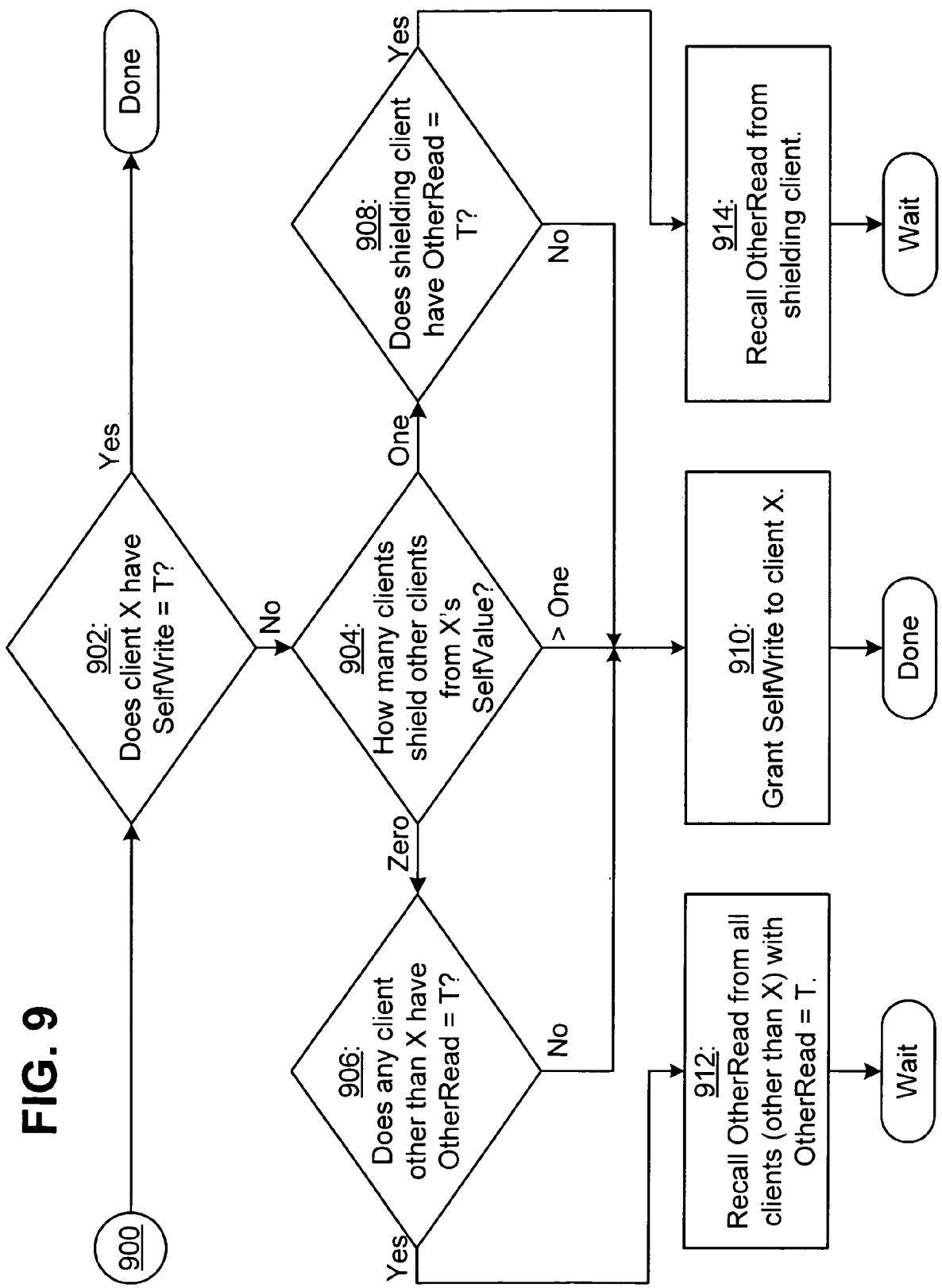
FIG. 9 is a logical flow diagram of the lease coordinator responding to a request for a SelfWrite lease, according to another embodiment.

The state diagrams of FIGS. 6 and 7 provide flexibility to the lease coordinator 106, allowing it to make policy-based decisions about which actions to perform in each state. To explore this aspect of the present invention deeper, the FARSITE™ embodiment includes a specific set of policies. FIGS. 8 and 9 illustrate the effects of the FARSITE™ policies when the lease coordinator 106 responds to requests for an OtherRead lease and for a SelfWrite lease, respectively.

In FIG. 8, the lease coordinator 106 processes a request from client X for an OtherRead lease. In step 802, if client X already has the lease, then the lease coordinator 106 is done. If not, then in step 804 the lease coordinator 106 determines whether it is in state 600 of FIG. 6. If it is, then in step 806 the lease coordinator 106 grants client X an OtherRead lease with an OtherValue 302 of True. If the lease coordinator 106 is not in state 600, then in step 808 the lease coordinator 106 determines whether it is in state 602 of FIG. 6. If it is, then in step 810 the lease coordinator 106 grants client X an OtherRead lease with an OtherValue 302 of False. If the lease coordinator 106 is not in state 602, then (by process of elimination) it must be in state 604 of FIG. 6, so the lease coordinator 106 in step 812 recalls a SelfWrite lease from at least one other client that holds the SelfWrite lease. In one embodiment, the lease coordinator 106 recalls all of the SelfWrite leases at this point, but some embodiments could be more conservative and recall only a subset of them in the hope that one of the SelfValues 300 in the subset is True, thereby obviating the recall of additional SelfWrite leases. After these one or more recalls are issued, the lease coordinator 106 waits until the leases are returned, and then it performs the steps of this flow diagram again starting at state 800.

In state 704 of FIG. 7, the lease coordinator 106 has two paths by which it can transit to state 700: (1) It can recall an OtherRead lease from a client that does not ignore client X's SelfValue 300, or (2) It can recall a SelfWrite lease from a client in an attempt to cause that client to become a shield for others. The former action is also possible in state 702, but the latter action is not. As a matter of policy, when processing a SelfWrite request, the FARSITE™ embodiment does not perform the latter action of recalling a SelfWrite lease from other clients. Therefore, the distinction between states 702 and 704 is immaterial to the actual SelfWrite request processing in FARSITE™. For this reason, the following description of FIG. 9 does not make reference to the states of FIG. 7.

FIG. 9 is a flow diagram of the steps the lease coordinator 106 follows when processing a request from client X for a SelfWrite lease. In step 902, if client X already has the lease, then the lease coordinator 106 is done. If not, then in step 904 the lease coordinator 106 determines how many shields there are for client X's SelfValue 300. There are three cases: (1) There are at least two shields; thus, the two (or more) shielding clients shield each other, and they also shield every other client, so control passes to step 910 where the lease coordinator 106 grants SelfWrite to client X. (2) There is exactly one shield, and in step 908 the lease coordinator 106 determines whether the shielding client ignores client X's SelfValue 300. If so, then in step 910 the lease coordinator 106 grants SelfWrite to client X. Otherwise, in step 914 the lease coordinator 106 recalls the OtherRead lease from the shielding client. (3) Finally, there are no shields, and in step 906 the lease coordinator 106 determines whether there are any other clients that do not ignore client X's SelfValue 300. If there are no such clients, then in step 910 the lease coordinator 106 grants SelfWrite to client X. Otherwise, in step 912 the lease coordinator 106 recalls the OtherRead leases from all such clients. After issuing the recalls of step 912 or step 914, the lease coordinator 106 waits until the leases are returned, and then it returns to step 900 to perform the steps of this flow diagram again.

In view of the many possible embodiments to which the principles of the present invention may be applied, it should be recognized that the embodiments described herein with respect to the drawing figures are meant to be illustrative only and should not be taken as limiting the scope of the invention. Those of skill in the art will recognize that some implementation details, such as the choices made in the FARSITE™ distributed file system, are determined by specific situations. Although the environment of the invention is described in terms of software modules or components, some processes may be equivalently performed by hardware components. Therefore, the invention as described herein contemplates all such embodiments as may come within the scope of the following claims and equivalents thereof.

We claim:

1. In a computing environment comprising a lease coordinator, a data object, and a plurality of client devices, a method for protecting consistency of properties of the data object, the method comprising:
   by each of at least a subset of the plurality of client devices, sending to the lease coordinator a self value representative of that client device's intended use of the data object;
   by the lease coordinator, receiving at least a subset of the self values sent by the plurality of client devices;
   by the lease coordinator, calculating, for a target client device, another value representative of an aggregation of the respective self values of the others of the subset of the plurality of client devices, the other value indicating which of a plurality of access modes are permissible for use by the target client device,
   wherein each other value is protected by another read lease controlling whether the client is authorized to observe the other value, and
   wherein the lease coordinator grants the other read lease to the target client device in an event at least one other client has a self value set TRUE, or in an event no other client has a self value set FALSE and none of the respective other clients is authorized to change the self value to TRUE; and
   by the lease coordinator, sending, to the target client device, the other value calculated for the target client device such that usage patterns of particular other clients are hidden from the target client device.

2. The method of claim 1, wherein the lease coordinator is one of the plurality of client devices.

3. The method of claim 2, wherein the lease coordinator is the target client device.

4. The method of claim 1, wherein the data object is selected from the group consisting of: a data file, a set of data files, contents of a data file, a data folder, a set of data folders, and a data field in a database.

5. The method of claim 1, wherein the self value is representative of an access mode selected from the group consisting of: read from the data object, write to the data object, delete the data object, exclude read from the data object, exclude write to the data object, and exclude delete the data object.

6. The method of claim 1, wherein the other value calculated is the aggregation of, at least in part, at least a subset of the self values sent by each of the subset of the plurality of client devices exclusive of the target client device.

7. The method of claim 1, wherein the self values sent by each of the subset of the plurality of client devices are Boolean values, and wherein further the calculating the other value comprises taking a logical OR of at least a subset of the self values sent by each of the subset of the plurality of client devices.

8. The method of claim 1, wherein the self values sent by each of the subset of the plurality of client devices are Boolean values, and wherein further calculating the other value comprises taking a logical AND of at least a subset of the self values sent by each of the subset of the plurality of client devices.

9. The method of claim 1, wherein the self values sent by each of the subset of the plurality of client devices are non-negative integers, and wherein further the calculating the other value comprises taking a minimum of at least a subset of the self values sent by each of the subset of the plurality of client devices.

10. The method of claim 1, wherein the self values sent by each of the subset of the plurality of client devices are non-negative integers, and wherein further the calculating the other value comprises taking a maximum of at least a subset of the self values sent by each of the subset of the plurality of client devices.

11. The method of claim 1, wherein the self values sent by each of the subset of the plurality of client devices are non-negative integers, and wherein further the calculating the other value comprises taking a sum of at least a subset of the self values sent by each of the subset of the plurality of client devices.

12. The method of claim 1, wherein the self values sent by each of the subset of the plurality of client devices are elements from a finite set, and wherein further the calculating the other value comprises taking a union of at least a subset of the self values sent by each of the subset of the plurality of client devices.

13. The method of claim 1, further comprising:
   by the target client device, using the data object, the using based, at least in part, on the received specific other value calculated for the target client device.

14. The method of claim 1, wherein each self value is protected by a self write lease controlling whether the client is authorized to change the self value.

15. A computer-readable storage medium having computer-executable instructions, that when executed by a processor, perform a method, in a computing environment comprising a lease coordinator, a data object, and a plurality of client devices, for protecting consistency of properties of the data object, the method comprising:
   by each of at least a subset of the plurality of client devices, sending to the lease coordinator a self value representative of that client device's intended use of the data object;
   by the lease coordinator, receiving at least a subset of the self values sent by the plurality of client devices;
   by the lease coordinator, aggregating the respective self values of the others of the subset of the plurality of client devices to calculate, for a target client device, another value representative of the target client device's permissible use of the data object, the other value indicating which of a plurality of access modes are permissible for use by the target client device,
   wherein each other value is protected by another read lease controlling whether the client is authorized to observe the other value, and wherein the lease coordinator grants the other read lease to the target client device in an event at least one other client has a self value set TRUE, or in an event no other client has a self value set FALSE and none of the respective other clients is authorized to change the self value to TRUE; and by the lease coordinator, sending to the target client device the other value calculated for the target client device, such that usage patterns of the other clients' are hidden from the target client device.

16. In a computing environment comprising a lease coordinator, a data object, and a plurality of client devices, a method for the lease coordinator to protect consistency of properties of the data object, the method comprising:

receiving from each of at least a subset of the plurality of client devices a self value representative of that client device's intended use of the data object;

calculating for a target client device another value representative of an aggregation of the respective self values of the others of the subset of the plurality of client devices, the other value indicating which of a plurality of access modes are permissible for use by the target client device, wherein each other value is protected by another read lease controlling whether the client is authorized to observe the other value, and wherein the lease coordinator grants the other read lease to the target client device in an event at least one other client has a self value set TRUE, or in an event no other client has a self value set FALSE and none of the respective other clients is authorized to change the self value to TRUE; and sending to the target client device the other value calculated for the target client device, such that usage patterns of the other clients are hidden from the target client device.

17. The method of claim 16, wherein the lease coordinator is one of the plurality of client devices.

18. The method of claim 16, wherein the data object is selected from the group consisting of:

a data file, a set of data files, contents of a data file, a data folder, a set of data folders, and a data field in a database.

19. The method of claim 16, wherein the self value is representative of an access mode selected from the group consisting of: read from the data object, write to the data object, delete the data object, exclude read from the data object, exclude write to the data object, and exclude delete the data object.

20. The method of claim 16, wherein the other value calculated is the aggregation of, at least in part, at least a subset of the self values sent by each of the subset of the plurality of client devices exclusive of the target client device.

21. The method of claim 16, wherein the self values sent by each of the subset of the plurality of client devices are Boolean values, and wherein further the calculating the other value comprises taking a logical OR of at least a subset of the self values sent by the plurality of client devices.

22. The method of claim 16, wherein the self values sent by each of the subset of the plurality of client devices are Boolean values, and wherein further the calculating the other value comprises taking a logical AND of at least a subset of the self values sent by the plurality of client devices.

23. The method of claim 16, wherein the self values sent by each of the subset of the plurality of client devices are non-negative integers, and wherein further the calculating the other value comprises taking a minimum of at least a subset of the self values sent by the plurality of client devices.

24. The method of claim 16, wherein the self values sent by each of the subset of the plurality of client devices are non-negative integers, and wherein further the calculating the other value comprises taking a maximum of at least a subset of the self values sent by the plurality of client devices.

25. The method of claim 16, wherein the self values sent by each of the subset of the plurality of client devices are non-negative integers, and wherein further the calculating the other value comprises taking a sum of at least a subset of the self values sent by the plurality of client devices.

26. The method of claim 16, wherein the self values sent by each of the subset of the plurality of client devices are elements from a finite set, and wherein further the calculating the other value comprises taking a union of at least a subset of the self values sent by the plurality of client devices.

27. A computer-readable storage medium having computer-executable instructions, that when executed by a processor, perform a method, in a computing environment comprising a lease coordinator, a data object, and a plurality of client devices, for the lease coordinator to protect consistency of properties of the data object, the method comprising:

receiving, from each of at least a subset of the plurality of client devices, a self value representative of that client device's intended use of the data object;

calculating for a target client device, another value representative of an aggregation of the respective self values of the others of the subset of the plurality of client devices, the other value being further representative of that target client device's permissible use of the data object by indicating which of a plurality of access modes are permissible for use by the target client device, wherein each other value is protected by another read lease controlling whether the client is authorized to observe the other value, and wherein the lease coordinator grants the other read lease to the target client in an event at least one other client has a self value set TRUE, or in an event no other client has a self value set FALSE and none of the respective other clients is authorized to change the self value to TRUE; and sending, to the target client device, the other value calculated for the target client device, such that usage patterns of the other clients are hidden from the target client device.

28. A system for protecting consistency of properties of a data object, the system comprising:

the data object;

a plurality of client devices, each client device configured for sending to a lease coordinator a self value representative of that client device's intended use of the data object;

the lease coordinator configured for:

receiving at least a subset of the self values sent by the plurality of client devices;

aggregating the respective self values of others of the plurality of client devices to calculate, for a target client device, another value specific for the target client device and representative of that target client device's permissible use of the data object, the other value indicating which of a plurality of access modes are permissible for use by the target client device, wherein each other value is protected by another read lease controlling whether the client is authorized to observe the other value, and wherein the lease coordinator grants the other read lease to the target client in an event at least one other client has a self value set TRUE, or in an event no other client has a self value set FALSE and none of the respective other clients is authorized to change the self value to TRUE; and sending to the target client device the other value calculated for the target client device such that usage patterns of the other clients are hidden from the target client device; and the target client device configured for receiving the other value calculated for the target client device.

29. The system of claim 28, wherein the lease coordinator is one of the plurality of client devices.

30. The system of claim 28, wherein the lease coordinator is the target client device.

31. The system of claim 28, wherein the data object is selected from the group consisting of: a data file, a set of data files, contents of a data file, a data folder, a set of data folders, and a data field in a database.

32. The system of claim 28, wherein the target client device is further configured for: using the data object, the using based, at least in part, on the received other value calculated for the target client device.

* * * * *